May 15, 1951 P. A. NOXON ET AL 2,553,268
ERECTION SYSTEM FOR GYROSCOPES
Filed Jan. 30, 1948 2 Sheets-Sheet 1

INVENTORS
JOHN A. MEAD
PAUL A. NOXON
BY
- ATTORNEY -

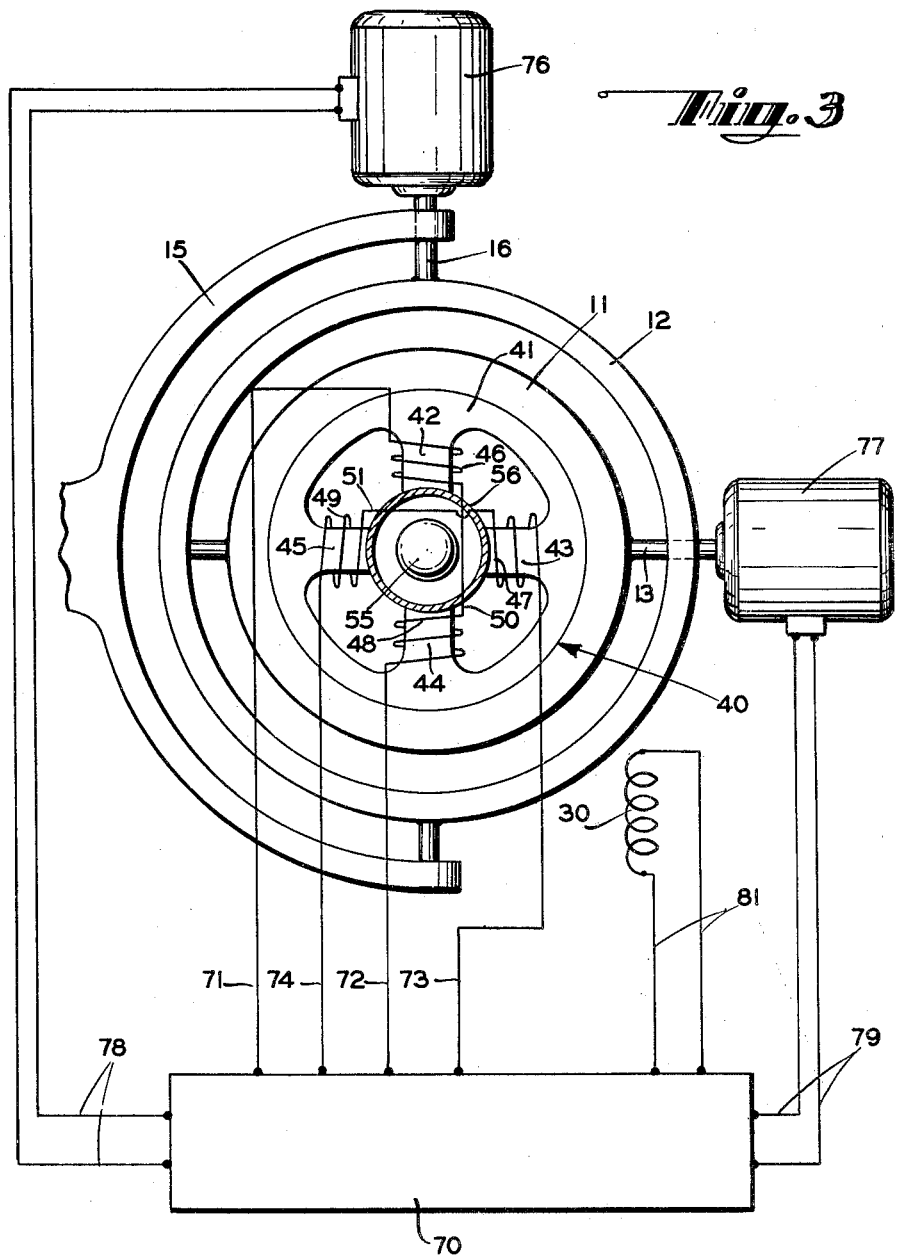

Patented May 15, 1951

2,553,268

UNITED STATES PATENT OFFICE 2,553,268

ERECTION SYSTEM FOR GYROSCOPES

Paul A. Noxon, Tenafly, N. J., and John A. Mead, Croton-on-Hudson, N. Y., assignors to Bendix Aviation Corporation, Teterboro, N. J., a corporation of Delaware Application January 30, 1948, Serial No. 5,314

17 Claims. (Cl. 74—5.47)

This invention relates to artificial horizon gyroscopes, and more particularly to a device for erecting and maintaining the spin axis of the gyroscope in a vertical position.

An object of our present invention is to provide an electrical erection system in which the departure of the gyroscope spin axis from its normally vertical position provides a displacement signal which controls the operation of a motor to provide an erecting torque to the gimbal of the gyroscope.

Another object of our invention is to provide an electrical erection system for a gyro-vertical of the general character indicated in which a displacement signal is provided by the change in reluctance of an inductive element mounted over the spin axis of the gyroscope.

A further object of this invention is to provide an electrical erection system for a gyro-vertical of the character indicated in which the departure of the spin axis of the gyroscope from a vertical position will set a rolling mass in motion to provide the displacement signal necessary for the subsequent erection of the spin axis to its vertical position.

Still another object of our invention is to provide an electrical erection system for a gyro-vertical of the character indicated in which the inductive element providing the displacement signal upon departure of the spin axis from its vertical position is periodically energized to provide intermittent erecting torques to the gimbals of the gyroscope.

Yet a further object of this invention is to provide an erection system for a gyro-vertical which shall consist of few and simple, trouble-free elements, which shall be easy to install and relatively inexpensive to manufacture, automatic and positive in its operation, and which shall have a large variety of applications and yet be practical and efficient to a high degree in use.

Other objects of this invention will in part be obvious, and in part hereinafter pointed out.

In the accompanying drawings forming a part of this specification in which two of the various possible illustrative embodiments of this invention are shown, and wherein similar reference characters designate corresponding parts throughout the several views:

Fig. 2 is an elevational cross-section of a second embodiment of our invention, while Fig. 3 is a wiring schematic diagram of the erection system and its connection to the torque producing motors for the two gimbal frames.

Figure 1:
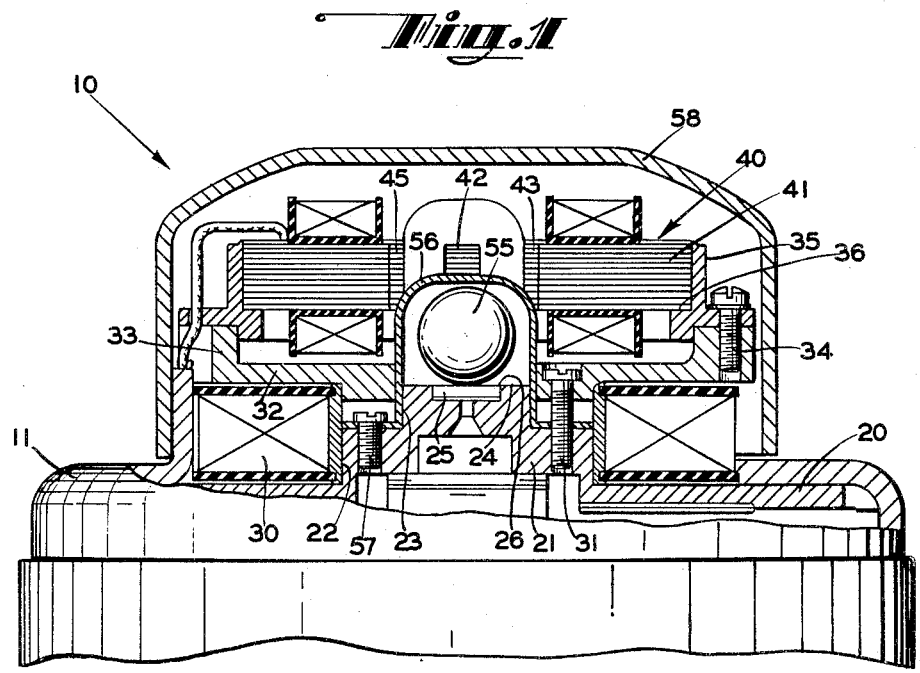
Fig. 1 is an elevational cross-section of an erecting device embodying our invention mounted over the spin axis of an artificial horizon gyroscope.

Referring now in detail to Fig. 1 of the drawings, the numeral 10 designates an erection mechanism embodying our invention mounted on the gyro casing 11, over the vertical spin axis of the rotor (not shown) therein. The gyro casing 11 is suspended in an inner gimbal ring 12 (Fig. 3) about a horizontal axis formed by the trunnions 13. The inner gimbal ring in turn is pivoted about a second horizontal axis normal to the first, in an outer gimbal frame 15 and formed by the supporting trunnions 16.

The erection device 10 of Fig. 1 is suitably mounted on a base plate 20 fixed to the top of the gyro casing 11. The base plate 20 is provided with a centrally disposed, raised section 21 formed with two offsets 22 and 23. The upper surface 24 of section 21 is provided with an insert 25, the surfaces 24 and 25 being preferably lapped to a flat finished surface 26, although a concave surface could be provided as well.

Fixed into the offset 22 and on the base plate 20 is an annular winding 30 encompassing the raised section 21. The winding 30 will hereinafter be referred to as the primary or energizing winding 30. Supported on said winding and fixed to said base plate, as by screws 31, is an annular supporting plate 32 formed with a centrally disposed opening and provided with an upturned flange 33. Fixed to the flange 33, as by screws 34, is a supporting ring 35 formed with an internal shoulder 36.

Supported within the ring 35 and on the shoulder 36 is a core and coil assembly 40. The assembly 40 comprises stacked ring laminations 41 formed with four inwardly extending radial sections to provide the pole pieces 42, 43, 44 and 45 (Fig. 3). Wound about each of the pole pieces are coil windings 46, 47, 48, and 49, respectively. For purposes hereinafter appearing, the diametrically opposite coils 46, 48 and the coils 47, 49 are oppositely wound and are interconnected in pairs by the respective leads 50 and 51. It will be noted that the poles of the assembly 40 coincide with the major and minor trunnion axis of the gyro-vertical. The coils 46, 47, 48 and 49 will hereinafter be referred to as the secondary windings or pick-up coils.

Supported on the surface 26 is a steel ball 55 adapted to roll thereon to a limited degree; an inverted non-magnetic cup 56 fixed to base plate 20, as by screws 57, within the central opening provided by the pole pieces 42–45 confining said ball. A cover 58 protects the mechanism described from dirt and injury.

Assuming the spin axis of the gyro vertical to be in its vertical position, the ball 55 will rest on surface 26 directly over the spin axis. A current flowing through the energizing winding 30 will induce equal voltages in each of the secondary windings 46-49. The secondary windings being series connected in opposition, the voltages induced in each pair of windings will cancel, with the result that no displacement or error signal will be available.

If we assume that the spin axis of the gyro vertical is tilted, the ball 55 will seek the lowermost position within the inclosure of the cup 56, thereby changing the reluctance of the magnetic paths between the primary winding 30 and the poles 42-45. The voltages induced in the pick-up windings will not be equal as in the example given. A difference in voltage will exist between the pairs of coils, the difference in amplitude and in phase being dependent upon the proximity of the ball to the poles. There is thus available a displacement or error signal voltage which may be used to erect the spin axis of the gyroscope.

Figure 2:
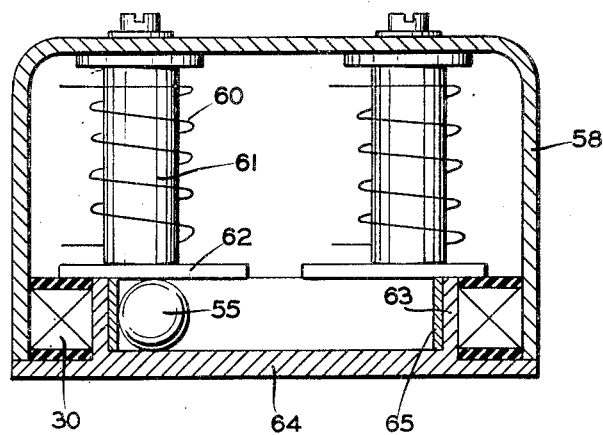

In Fig. 2 we have shown another embodiment of our invention in which the secondary windings 60 are vertically disposed about the poles 61, each of the poles being provided with a pole shoe 62. The ball 55 is permitted to roll within an inclosure formed by the pole shoes 62 and a supporting ring 63 provided on the base 64. The energizing winding 30 is supported on the base 64 and encompasses the ring 63. The ring is provided with an inner lining ring 65 of nonmagnetic material. It will be noted that the ball in this instance is permitted to roll under the poles 62, while in the example previously illustrated, the ball rolled into proximity of the poles.

As will be apparent to those versed in the art, a current flowing through the primary winding 30 will, upon tilt of the gyro spin axis, hold the ball in the position to which it has rolled, by magnetic attraction. In operation, therefore, the energizing winding 30 is intermittently pulsed to permit the magnetic field to decay. The decay of the magnetic field will allow the ball to roll freely upon tilt of the spin axis to set up the required displacement signals. To aid in freeing the ball, the cup 56 and ring 65 are of non-magnetic material such as copper or brass.

In erecting the spin axis of a gyro vertical upon departure thereof from its vertical position, a force is applied at right angles to the plane of departure to provide the required erecting torque. If we assume the trunnions 13 to be in line with the fore and aft axis of an aircraft, this axis of suspension will form the bank axis, while the trunnions 16 will form the pitch axis of the craft. A departure then, of the gyro spin axis from the vertical position in the plane of the bank axis will require a force to be applied at right angles thereto, or along the pitch axis. A departure of the spin axis in planes other than those corresponding with the major and minor axes will require a force to be applied to both axes of suspension, the vectoral sum of such forces being at right angles to the plane of departure.

In Fig. 3 of the drawings we have shown a schematic wiring diagram of the erection mechanism in which an amplifier is connected to the ends of the pick-up coils 46, 48 and 47, 49 by the leads 71, 72, and 73, 74, respectively. The amplifier comprises a phase discriminator and amplifier circuit for each axis of tilt, the output of each channel being applied to the torque producing motors 76 and 77 by the leads 78 and 79, respectively. The motor 76 is adapted to provide a precessing torque about the pitch axis 16; while motor 77 provides a precessing torque about the bank axis 13.

The signals induced in the pick-up coils 46, 48 are processed by the amplifier 70 and applied via the leads 79 to the torque motor 77, the direction of the precessing torque applied being dependent upon the resultant of the voltages induced in the two coils. The precessing torque of motor 76 in response to the signals of the coils 47, 49 is applied in a similar manner.

The energizing coil 30, connected by the leads 81 into the amplifier, is pulsed by a delay oscillator of suitable design. The coil is thus periodically energized and de-energized to induce the displacement signals in the secondary coils. The torque motors 76, 77 are thus energized periodically upon a departure of the gyro spin axis to provide a high instantaneous erecting torque which is extremely advantageous in overcoming the inherent bearing friction of the gyroscope.

It will be appreciated by those skilled in the art that the erecting mechanism herein disclosed can be supported in a pendulous position on the bottom of the gyro casing 11.

It will thus be evident that there is provided a gyro precessing system in which the several objects of this invention are achieved, and which is well adapted to meet the conditions of practical use.

As various embodiments may be made of the above invention, and as various changes may be made in the two embodiments set forth above, it will be understood that all matter herein set forth, or shown in the accompanying drawings is to be interpreted as illustrative and not in a limiting sense.

Having thus described our invention, we claim as new and desire to secure by Letters Patent:

1. In a gyro precessing system, the combination comprising a gyroscope, an inductive element on said gyroscope, a rolling mass, a surface mounting said mass for rolling movement in the magnetic field of the inductive element to vary the reluctance of said inductive element upon departure of the spin axis of said gyroscope from a reference axis and provide a displacement signal in said element, and means for precessing said gyroscope in response to said displacement signal.

2. In a gyro precessing system, the combination comprising a gyroscope, an inductive element on said gyroscope having a primary and secondary windings, means for energizing said primary winding, a surface associated with said element, a mass adapted to roll on said surface within the path of the magnetic field of said primary and secondary windings upon departure of the gyroscope spin axis from a reference axis to vary the reluctance of said path and provide displacement signals in said secondary windings; and means for precessing said gyroscope in response to said signals.

3. In a gyro precessing system, the combination comprising a gyroscope, an inductive element on said gyroscope having a primary and secondary windings, means for energizing intermittently said primary winding, an upwardly facing surface associated with said windings, a mass rolling on said surface within the path of the magnetic field of said primary and secondary windings upon departure of the gyroscope spin axis from a reference axis to vary the reluctance of said path and provide displacement signals in said secondary windings; and means for precessing intermittently said gyroscope in response to said signals.

4. In a gyro erecting system, the combination with a gyro-vertical, of an inductive element mounted on said gyroscope, a rolling mass adapted to vary the reluctance of said element upon departure of the gyroscope spin axis from its vertical position to develop a displacement signal therein, a surface supporting said mass for rolling movement in the magnetic field of said inductive element, and means for precessing said gyroscope in response to said signal.

5. In a gyro erecting system, the combination with a gyro-vertical, of an inductive element mounted on said gyroscope concentrically with the spin axis thereof, a rolling mass adapted to vary the reluctance of said element upon departure of the gyroscope spin axis from its vertical position to develop a displacement signal therein, a surface supporting said mass for rolling movement in the magnetic field of said inductive element, and means for precessing said gyroscope in response to said signal.

6. In a gyro erecting system the combination with a gyro-vertical, of an inductive element mounted on said gyroscope concentric with the spin axis thereof and having primary and secondary windings, means for energizing the primary windings of said element, a rolling mass, a surface supporting said mass for rolling movement within the path of the magnetic field of said element to vary the reluctance thereof upon departure of the gyro spin axis from its vertical position to provide a displacement signal in said secondary windings, and means for precessing said gyroscope in response to said signal.

7. In a gyro erecting system the combination with a gyro-vertical, of an inductive element mounted on said gyroscope concentric with the spin axis thereof and having primary and secondary windings, means for energizing intermittently the primary winding of said element, a rolling mass, a surface mounting said mass for rolling movement within the path of the magnetic field of said element to vary the reluctance thereof upon departure of the gyro spin axis from its vertical position to provide a displacement signal in said secondary windings, and means for precessing intermittently said gyroscope in response to said signals.

8. In a gyro precessing system, the combination of an inductive element having primary and secondary windings, a rolling mass, and a surface mounting said mass for rolling movement within the magnetic field created upon energization of the primary winding to vary the reluctance of said element, when the spin axis of the gyroscope departs from a reference axis, to provide a displacement signal in said secondary windings for precessing the gyroscope.

9. In a gyro precessing system the combination of primary and secondary windings in inductive relation; an upwardly facing surface, an inclosure in juxtaposition with said windings and enclosing said surface, a rolling mass within said inclosure and rolling on said surface within the magnetic field created upon energization of the primary winding to vary the reluctance of the path of the magnetic field when the spin axis of the gyroscope departs from a reference axis, to provide a displacement signal in said secondary windings for precessing the gyroscope.

10. In a gyro precessing system the combination of primary and secondary windings in inductive relation; an inclosure in juxtaposition with said windings, said inclosure being of a non-magnetic material; a rolling mass within said inclosure, and a surface supporting said mass for rolling movement within the magnetic field created upon energization of the primary winding to vary the reluctance of the path of the magnetic field, when the spin axis of the gyroscope departs from a reference axis, to provide a displacement signal in said secondary windings for precessing the gyroscope.

11. In a gyro precessing system, the combination of an energized primary winding with a plurality of secondary coils in inductive relation with said primary winding, said secondary coils being connected in series opposed relation in pairs; of an inclosure in juxtaposition with said winding and coils, a rolling mass within said inclosure, and a surface supporting said mass for rolling movement within the magnetic field of said winding to vary the reluctance of the path of the magnetic field upon departure of the spin axis of the gyroscope from a reference axis to provide a displacement signal in said pairs of coils for precessing the gyroscope.

12. In a gyro precessing system, the combination of an intermittently energized primary winding with a plurality of secondary coils in inductive relation with said primary winding, said secondary coils being connected in series opposed relation in pairs; of an inclosure in juxtaposition with said winding and coils, said inclosure being of non-magnetic material; a rolling mass within said inclosure, and a surface supporting said mass for rolling movement within the magnetic field of said winding to vary the reluctance of the path of the magnetic field upon departure of the spin axis of the gyroscope from a reference axis to provide a displacement signal in said pairs of coils for precessing the gyroscope.

13. In a gyro erecting system, the combination of a laminated ring core of highly permeable material formed with diametrically opposed poles, coils on said poles interconnected in series opposed relation in pairs, an energized primary winding, a rolling mass, and a surface supporting said mass for rolling movement within the magnetic field of the primary winding to vary the impedance of the magnetic circuits upon departure of the gyroscope spin axis from its vertical position to provide a displacement signal in said pairs of coils for erecting the gyroscope spin axis.

14. In a gyro erecting system, the combination of a laminated ring core of highly permeable material formed with a plurality of diametrically opposed poles, coils on said poles series connected in pairs in opposed relation, an energized primary winding, an inclosure in juxtaposition with said coils and winding, a rolling mass within said inclosure, and a surface supporting said mass for rolling movement within the magnetic field of the primary winding to vary the impedance of the magnetic circuits upon departure of the gyroscope spin axis from its vertical position to provide displacement signals in said pairs of coils for erecting the gyroscope spin axis.

15. In a gyro erecting system, the combination of a laminated ring core of highly permeable material formed with a plurality of diametrically opposed poles, coils on said poles series connected in pairs in opposed relation, an intermittently energized primary winding, an inclosure in juxtaposition with said coils and winding, said inclosure being of a non-magnetic material, a rolling mass within said inclosure, and an upwardly facing surface supporting said mass for rolling movement in the magnetic field of the primary winding to vary the impedance of the magnetic circuits upon departure of the gyroscope spin axis from its vertical position to provide displacement signals in said pairs of coils for erecting the gyroscope spin axis.

16. In a gyro erecting system, the combination of a laminated ring core of highly permeable material formed with a plurality of diametrically opposed poles, coils on said poles series connected in pairs in opposed relation, an intermittently energized primary winding in ring form, a circular inclosure in juxtaposition with said coils and winding, said inclosure being of a non-magnetic material; said core winding and inclosure being concentric with the spin axis of the gyroscope, a surface enclosed by said inclosure and a mass rolling on said surface in the magnetic field of the primary winding within said inclosure and adapted to vary the impedance of the magnetic circuits upon departure of the gyroscope spin axis from its vertical position to provide displacement signals in said pairs of coils for erecting the gyroscope spin axis.

17. In a gyro erecting system, the combination of an even number of poles spaced equidistant from the spin axis of the gyroscope and from each other, coils on said poles connected in pairs in series opposition, an energized primary winding in inductive relation with said coils, a circular inclosure in juxtaposition with said coils and winding, a rolling mass within said inclosure, and an upwardly facing surface supporting said mass for rolling movement within the magnetic field of said primary winding to vary the impedance of the magnetic circuits upon departure of the gyroscope spin axis from its vertical position to provide displacement signals in said pairs of coils for erecting the gyroscope spin axis.

PAUL A. NOXON.
JOHN A. MEAD.

REFERENCES CITED

The following references are of record in the file of this patent:

UNITED STATES PATENTS

| Number | Name | Date |
|---|---|---|
| 1,972,882 | Gillmor | Sept. 11, 1934 |
| 2,087,961 | Anscott | July 27, 1937 |
| 2,382,993 | Haskins | Aug. 21, 1945 |
| 2,392,370 | Esval et al. | Jan. 8, 1946 |
| 2,456,619 | Curry, Jr. et al. | Dec. 21, 1948 |